(12) United States Patent
Dokter et al.

(10) Patent No.: US 7,037,475 B2
(45) Date of Patent: May 2, 2006

(54) PRECIPITATED SILICA PARTICLES FOR CAT LITTER

(75) Inventors: Willem Hendrik Dokter, Almere (NL); Willem Taede Hulshof, Zeewolde (NL); Nicolaas H. M. Leliveld, Maastricht (NL); Jürgen Koltzer, Heimbach (DE)

(73) Assignee: Grace GmbH & Co. KG, Worms (DE)

( * ) Notice: Subject to any disclaimer, the term of this patent is extended or adjusted under 35 U.S.C. 154(b) by 0 days.

(21) Appl. No.: 10/433,924

(22) PCT Filed: Dec. 14, 2001

(86) PCT No.: PCT/EP01/14854

§ 371 (c)(1),
(2), (4) Date: Feb. 5, 2004

(87) PCT Pub. No.: WO02/48037

PCT Pub. Date: Jun. 20, 2002

(65) Prior Publication Data

US 2004/0146444 A1    Jul. 29, 2004

(30) Foreign Application Priority Data

Dec. 14, 2000 (EP) .................................. 00204527

(51) Int. Cl.
*C01B 33/12* (2006.01)

(52) U.S. Cl. ...................... 423/335; 423/339

(58) Field of Classification Search ................ 423/333, 423/335, 339
See application file for complete search history.

(56) References Cited

U.S. PATENT DOCUMENTS

| 4,914,066 A | * | 4/1990 | Woodrum | ..................... 502/62 |
| 5,851,502 A | * | 12/1998 | Turk et al. | ................... 423/335 |
| 5,871,867 A | * | 2/1999 | Rausch et al. | .............. 429/247 |
| 5,925,708 A | * | 7/1999 | Esch et al. | ................... 524/493 |
| 6,180,076 B1 | * | 1/2001 | Uhrlandt et al. | ............ 423/335 |
| 6,610,266 B1 | * | 8/2003 | Witham et al. | ............ 423/331 |

FOREIGN PATENT DOCUMENTS

| EP | 0 303 760 | 2/1989 |
| EP | 0 901 986 | 3/1999 |
| EP | 1 029 448 | 8/2000 |
| WO | 88/00434 | 1/1988 |
| WO | 97/46485 | 12/1997 |
| WO | 98/27809 | 7/1998 |

\* cited by examiner

*Primary Examiner*—Colleen P Cooke
(74) *Attorney, Agent, or Firm*—William D. Bunch

(57) ABSTRACT

The invention pertains to precipitated silica particles having edged surfaces and a length: width: depth ratio of 1:1:1 to 3:3–1:1 with the length being 0.25 to 15 mm, an absorbing capacity PV water (wt. % >;125, a pore volume PV Hg (ml/g) 0.8–4, a pore volume PV $N_2$ (ml/g) 0.2–1.5, a bulk density BD (g/l) 200–500, and preferably a pH<8, for use as a cat liter.

15 Claims, No Drawings

PRECIPITATED SILICA PARTICLES FOR CAT LITTER

The invention pertains to precipitated silica particles, pet litter comprising these particles and use of these particles to make pet litter.

Pet litter is extensively used, especially cat litter, since a considerable number of cats is held as pets. For instance, 34% of all US households possess a cat. In Europe it is estimated that comparable numbers of cats are held as pets. For this reason there is a significant market for cat litter.

The cat litter market consists of various materials, but is dominated by clay minerals. A break-through was the introduction of Na-montmorillonite clay (Na-bentonite) which was the first clumping cat litter. This material has excellent absorbency and forms discrete clumps around the cat's waste that can be removed, still leaving the remainder of the litter unsoiled. In Europe this material is mainly composed of Ca-montmorillonite clay. A substantial improvement to this material was the addition of sodium bicarbonate, which appeared to be an excellent odor control agent. Despite the many advantages of this product, Na— and Ca-montmorillonite clay are relatively heavy, contain substantial amounts of dust, which causes a main health concern since this is suspected to be a carcinogenic component in bentonite, and are environmental unfriendly. These clays must be strip mined to obtain it. Strip mining creates irreversible damage to the earth.

This latter disadvantage encouraged cat litter producers to look for alternatives. A more environmental friendly product was obtained from recycled newspapers and marketed under the fancy trade brand name Yesterday's News®. Another non-clay litter is a silica gel based product that was launched recently. These products are sold in the form of small, hard, transparent gel beads, "pearls", or "crystals". These beads contain millions of micropores, which absorb and evaporate moisture, while locking away the odor inside. However, their absorbing capacity is still not much more than their own weight and there is room for further improvement.

The ideal cat litter must satisfy the following requirements:

long term odor retention
excellent moisture absorption
dust-free
high acceptance by cat
should not stick to the cat's paws
light weighted
environmental friendly None of the known cat litters satisfies to all of these requirements. We have now found a new pet litter that is particularly suitable as cat litter, and which satisfies all of above requirements.

The invention pertains to precipitated silica particles having edged surfaces and a length:width:depth ratio of 1:1:1 to 3:3-1:1 with the length being 0.25 to 15 mm, an absorbing capacity PV water (wt. %) >125, a pore volume PV Hg (ml/g) 0.8–4, a pore volume PV $N_2$ (ml/g) 0.2–1.5, and a bulk density BD (g/l) 200–500.

A further aspect of the invention is the pet litter, particularly cat litter comprising the above precipitated silica, and the use of said silica for making the pet litter.

The length:width:depth ratio is important for obtaining particles that do not stick to the animal's paws and at the same time feel comfortable to the animal, such that it accepts the litter to go onto it. The largest distance of the particle is called the length, the smallest the depth, and the intermediate distance is the width. The particles have edged surfaces in order to prevent rolling around. This has the advantage that the particles do not roll around and stray far from the litter box if spilt during filling. Preferably, the particles have a cubic format. Some of the edges may be rounded-off, but not to such a degree that the particles can roll away.

The pet litter of the invention may have a pH in the range of about pH 4 to about pH 11. Preferred pet litter according to the invention has a pH of 8 or less, and more preferably a pH less than 6. The standard products coming from the rotary oven have a pH of between 6 and 8. However, for the use of these silicas as cat litter, it was found that odor retention was further improved when the pH was decreased to pH<6. This is remarkable and unexpected, because it is common to obtain such odor improvement by adding basic sodium bicarbonate to cat litter, and known cat litters have pH values as high as 10 (for example, Catsan Ultra® pH 9.6, Sivomatic® pH 10.0).

In a most preferred embodiment the silica particles have a PV water (wt.%) >140, a pore volume PV Hg (ml/g) 1.2–2.5, a pore volume PV $N_2$ (ml/g) 0.3–0.9, a bulk density BD (g/l) 250–400, and a pH <6.

Another aspect of the invention is a method of making the precipitated silica. The process started with the simultaneous addition of water glass and a mineral acid into a heel of water, and was maintained at a specific pH between 5 and 10. This process was continued for 1 to 4 hours, and precipitated silica slurry was obtained. The reaction slurry was subsequently brought onto the required pH, and preferably acidified to a pH between 2 and 6. This slurry was then pumped to filter presses, in which the slurry was filtered and washed to remove excess salt from the filter cake. When preparing embodiments in which the litter has a pH of less than 6, the aforementioned reaction slurry can be acidified to a pH in lower of half the above-mentioned pH range of 2–6 and the resulting filter cake is then washed for shorter period of time, with the time depending on the filter cake pH selected.

This filter cake, containing between 15 and 35% of dry solids (silica plus salt left), was then chopped and transported to a filter cake bunker at the entrance of the rotary dryer. This filter cake was fed to the rotary dryer in which the filter cake was both dried and shaped simultaneously. The dryer is a so-called rotary dryer which is a long tube of approximately 20 m and having a diameter of approximately 2.5 m. This dryer was positioned under a certain slope In order to transport the silica in the dryer from the entrance to the exit position. Inside the dryer, 3 layers of heat transferring pipes are attached close to the outer wall, which are shaped such to increase the heat transferring surface area. Steam was led through the pipes in order to provide the energy necessary for evaporating the water from the filter cake. Furthermore, a slight under pressure was applied in order to remove the evaporated water from the dryer. The residence time of the filter cake In the dryer ranged from 1 to 6 hours. Due to the rotary movement of the dryer, the filter cake was rolling inside the dryer. First the filter cake was transported to that wall of the dryer moving up due to the rotary movement. When stacked to high, the filter cake rolled back under influence of the gravity and the slope of the amount of filter cake present on that side. In this way the filter cake was rolled up and down during most of its time that it was present in the dryer. After the silica was partially, or even fully dried, this rotary movement was enhanced. In this way the silica was shaped into a bead-like material.

These beads are not completely round, but have edges. The fact that these particles are not completely round may be due to the long residence time and the forces applied on the silica beads in the dryer in that time. After partially and further drying, the silica may become more vulnerable to the presence of the three layers of the finned heating pipes and some abrasion may take place. This abrasion is probably less in the beginning of the dryer, since the silica is at that point still contained in the filter cake, which has more elasticity and which is stickier than the dried silica.

From this process essentially rounded particles, however with edges, are obtained. These silica beads were then taken from the dryer, possibly sieved to remove the particles that are too small or too large, and bagged.

A specific product of the invention was dried at a steam pressure at a temperature of 100 to 130° C. inside the dryer. The residence time for this specific product is between 1 and 3 hours.

In certain embodiments of the inventive litter, the finished product from this process can be impregnated with an acid to obtain litter having a pH 6 or less. Weak acids are particularly suitable and include organic acids such as citric acid, oxalic acid, and the like. The concentration of impregnating acid is preferably chosen such that a good solution of the acid is obtained in as less as possible water. The litter can optionally be dried after impregnation using conventional techniques, for instance when the moisture content is more than 10 wt. %. Higher contents of water resulting from the impregnation solution (the solution of the organic or inorganic acid in water) may have a detrimental effect on the cat litter's performance. Preferably, the moisture content is less than 5 wt. %, more preferably less than 2 wt. %.

One of the most essential characteristics of the product is its shape. It is of importance that the particles have an edged structure. Preferably, they have a round-like structure with edges, i.e. they are not completely round. Particles having completely round structures as cat lifter will very easily move in the cat toilet, causing the cat to "sink" into the cat litter, and furthermore, the completely rounded particles may be pushed outside the cat toilet and roll through the room in which the cat toilet is placed or spilled during filling the toilet. These particles are then very difficult to collect since they start rolling on touching.

The particles of the invention have a clearly edged surface, and are not able to roll very far. Closer examination shows that the particles are very irregularly shaped, i.e. have a stone like structure, with surprisingly flat edges in some occasions. Due to the irregular shape, which is preferred, the particles do not roll very far and the bed of particles in the cat toilet is not moving when the cat walks or sits on it.

When describing the particles, the length to width to depth ratio may be ranging from 1:1:1, i.e. essentially round (however with edged surface) or cubic, to 3:3–1:1 for particles which are more rod shaped then others. The edge of a particle with a ratio close to 1:1:1 is better able to withstand applied forces. Further, it was experienced that the cat's acceptance of the particles diminished for thin rod-like structures.

When for example densified and roll-compacted silica is applied, the particles obtained are essentially rod shaped. This implies that these particles will break more easily upon load. When breaking, small fragments are also broken off from the breaking planes, resulting in the formation of undesired small (dust) particles. Furthermore, in this way compacted particles will have sharp edges, hindering or irritating and possibly damaging the cat's paws.

Beads obtained from a rotary dryer have a size distribution of between approximately 0.25 and 15 mm (unsleved). One particular particle, for example, was sized 8:5:4 mm (ratio 2:1, 25:1).

In another experiment unsieved particles had sizes (in mm): 7:5:4, 6:5:3, 6:3:2, 6:5:4 to 0.5:0.5:0.5. For the ratio this means 1.75:1.25:1; 2:1.7:1; 3:1.5:1; 1.7:1.25:1; to 1:1:1, respectively. This product was sieved over a 1.6 mm sieve, after which the sieved particles had sizes (in mm): 8:6:5, 7:5:5, 6:5:5, 6:5:4, 5:4:4, to 1.5:1.5:1.5, corresponding to ratio's of 1.6:1.2:1; 1.4:1:1; 1.2:1:1; 1.7:1.25:1; 1.25:1.25:1; 1:1:1, respectively.

In Table I properties of some product according to the invention are given.

TABLE I

| | | Product of invention: | | | | | |
|---|---|---|---|---|---|---|---|
| | | BET ($m^2/g$) | PV $N_2$ (ml/g) | SA Hg ($m^2/g$) | PV Hg (ml/g) | PV water (wt. %) | BD (g/l) |
| Product I | Not sieved | 192 | 0.51 | 186 | 1.79 | 223 | 297 |
| Product I | Sieved with 1.6 mm sieve | 192 | 0.50 | 188 | 1.73 | 177 | 290 |
| Product II | Not sieved | 120 | 0.26 | 117 | 1.55 | 151 | 301 |
| Product II* | Not sieved | 120 | 0.27 | 124 | 1.68 | 159 | 282 |
| Product III** | Not sieved | 168 | 0.42 | 175 | 1.92 | 263 | 308 |

*duplo experiment
**boron-containing silica

Analytical Methods:

Nitrogen physisorption. With this method the specific surface area BET is determined with a so-called multi-point analysis. Also the pore volume $N_2$ is determined with this method; the pore volume is analyzed for pores up to a maximum of 60 nm.

Mercury intrusion (Hg). With this method also a specific surface area is determined (SA Hg) and a pore volume (PV Hg). The results of this technique are very dependent on which surface tension and contact angle are used (for SA Hg) and on the pressure range applied and used for calculation (for PV Hg). We used:

Surface tension: 480 dynes/cm

Contact angle: 141.3 degrees

Pressure range: 0–2000 bar

The PV water is performed as follows. An exact known amount of approximately 20 g of silica particles, is placed on a sieve. The bed height of the sieve Is approximately 3–4 cm.

Water is "dropped" onto this bed of silica or any other material, until the first drop is visible below the bed. The total amount of water added until this point is carefully determined. This amount of water is then divided by the amount of silica in the bed and multiplied with 100 to obtain the percentage of absorption. A value of 100 indicates that per 1 g of silica (or any other absorbent), 1 g of water is absorbed.

Bulk density (BD). The BD is determined by filling a graduated cylinder to a specific volume (250 ml) and weighing the amount of silica added. The BD in g/l is obtained by dividing the amount (mass) of silica added by the volume of 250 ml.

The pH of a dried silica is analyzed by taking 5 g of (milled) silica, adding 95 g of water, and recording the pH after stirring the slurry for 5 min.

It was found that boron-containing beads absorb more water than the non-boron standard beads from the rotary dryer, and such beads, although more expensive, are preferred from a view point of efficacy. Moreover, boron is known to have anti-septic properties, and may thus be very useful in this respect.

The silica particles of the present invention are superior to known cat litter products, which are denoted in the following Table II:

TABLE II

| | | Competition products | | | | | |
|---|---|---|---|---|---|---|---|
| | | BET ($m^2/g$) | PV $N_2$ (ml/g) | SA Hg ($m^2/g$) | PV Hg (ml/g) | PV water (wt. %) | BD (g/l) |
| silica gel | Silica gel pearls | 355 | 1.08 | 220 | 0.71 | 108 | 419 |
| Sivomatic ™ | bentonite? | 56 | 0.08 | 18 | 0.20 | 52 | 540 |
| Catsan Ultra ™ | lime and quartz sand | 71 | 0.14 | 58 | 0.76 | 123 | 897 |
| Catsan ™ | lime and quartz sand | n.a. | n.a. | n.a. | n.a. | 98 | 520 |
| No Problem ™ | bentonite | n.a. | n.a. | 19 | 0.24 | 115 | 1014 |
| Kat Ideal ™ | bentonite? | n.a. | n.a. | 24 | 0.23 | n.a. | n.a. |
| Foetsie-Ba ™ | Möler clay | n.a. | n.a. | n.a. | n.a. | 91 | 570 |
| Cordi ™ | attapulgite | n.a. | n.a. | n.a. | n.a. | 99 | 608 | n.a. = not analyzed

The precipitated silica particles of the invention are lighter than the known competition products, even lighter than the silica gel pearls, and they absorb more water than the known competitor products.

Due to the hardness of precipitated silica, the amount of dust is minimal.

Due to the porosity of the beads, the urine smell is reduced to a minimum. At low pH a further reduction can be obtained.

The invention claimed is:

1. Precipitated silica particles having edged surfaces and a length: width: depth ratio of 1:1:1 to 3:3–1:1 with the length being 0.25 to 15 mm, an absorbing capacity PV water (wt. %)>125, a pore volume PV Hg (ml/g) 0.8–4, a pore volume PV $N_2$ (ml/g) 0.2–1.5, and a bulk density BD (g/l) 200–500.

2. The precipitated silica particles of claim 1 wherein the pH is 8 or less.

3. The precipitated silica particles of claim 2 wherein the adsorbing capacity PV water (wt. %)>140, the pore volume PV Hg (ml/g) 1.2–2.5, the pore volume PV $N_2$ (ml/g) 0.3–0.9, the bulk density BD (g/l) 250–400, and the pH<6.

4. The precipitated silica particles of claim 1 wherein the particles comprise flat edges.

5. The precipitated silica particles of claim 1 wherein said particles comprise boron.

6. Pet litter comprising the precipitated silica of any one of claims 1 to 5.

7. Method for the preparation of the precipitated silica an one of claims 1 to 5 comprising the steps of adding water glass and a mineral acid into a heel of water to obtain a slurry, and optionally adding a boron compound, maintaining the pH between 5 and 10 for 1 to 4 hours, adding optionally a boron compound, optionally followed by acidifying the slurry to a pH between 2 and 6, converting the slurry to a filter cake, feeding the filter cake to a dryer and shaping it to a particle having edged surfaces and a length: width:depth ratio of 1:1:1 to 3:3–1:1 with the length being 0.25 to 15 mm.

8. The precipitated silica particles of claim 1 wherein the pH is 6 or less.

9. Precipitated silica particles having edged surfaces and a length:width:depth ratio of 1:1:1 to 3:3–1:1 with the length being 0.25 to 15 mm, and an absorbing capacity PV water (wt. %)>125.

10. The precipitated silica particles of claim 9 wherein the pH is 8 or less.

11. The precipitated silica particles of claim 9 wherein the adsorbing capacity PV water (wt. %)>140, the pore volume PV Hg (ml/g) 1.2–2.5, the pore volume PV $N_2$ (ml/g) 0.3–0.9, the bulk density BD (g/l) 250–400, and the pH<6.

12. The precipitated silica particles of claim 9 wherein the particles comprise flat edges.

13. The precipitated silica particles of claim 1 wherein the particles comprise boron.

14. Pet litter comprising the precipitated silica of claim 9.

15. Method for the preparation of the precipitated silica according to claim 9 comprising the steps of adding water glass and a mineral acid into a heel of water to obtain a slurry, and optionally adding a boron compound, maintaining the pH between 5 and 10 for 1 to 4 hours, adding optionally a boron compound, optionally followed by acidifying the slurry to a pH between 2 and 6, converting the slurry to a filter cake, feeding the filter cake to a dryer and shaping it to a particle having edged surfaces and a length: width:depth ratio of 1:1:1 to 3:3–1:1 with the length being 0.25 to 15 mm.

* * * * *